(12) United States Patent
Markendorf et al.

(10) Patent No.: US 6,675,122 B1
(45) Date of Patent: Jan. 6, 2004

(54) INDIRECT POSITION DETERMINATION WITH THE AID OF A TRACKER

(75) Inventors: Albert Markendorf, Suhr (CH); Raimund Loser, Bad Säckingen (DE); Bernhard Hauri, Staffelbach (CH)

(73) Assignee: Leica Geosystems AG, Unterentfelden (CH)

(*) Notice: Subject to any disclaimer, the term of this patent is extended or adjusted under 35 U.S.C. 154(b) by 0 days.

(21) Appl. No.: 10/019,762

(22) PCT Filed: Apr. 13, 2000

(86) PCT No.: PCT/CH00/00216
§ 371 (c)(1),
(2), (4) Date: Feb. 25, 2002

(87) PCT Pub. No.: WO00/63645
PCT Pub. Date: Oct. 26, 2000

(30) Foreign Application Priority Data

Apr. 19, 1999 (CH) .................................... 716/99

(51) Int. Cl.⁷ .......................... G01B 11/00; G06F 15/00
(52) U.S. Cl. .................. 702/150; 702/158; 702/159; 702/167; 356/614; 356/620
(58) Field of Search .................. 702/150, 151, 702/152, 153, 154, 158–159, 163, 164, 167, 187; 356/317, 612, 614, 620

(56) References Cited

U.S. PATENT DOCUMENTS

| 5,198,877 A | * | 3/1993 | Schulz ........................ 356/614 |
| 5,305,091 A | * | 4/1994 | Gelbart et al. .............. 356/620 |
| 5,440,392 A | * | 8/1995 | Pettersen et al. ........... 356/620 |
| 5,973,788 A | * | 10/1999 | Pettersen et al. ........... 356/614 |

FOREIGN PATENT DOCUMENTS

| DE | 33 40317 A1 | 8/1984 |
| DE | 3808 972 A1 | 10/1989 |
| DE | 40 38 521 A1 | 6/1991 |
| DE | 4038521 A1 | * 6/1991 | ............ G01C/3/26 |

OTHER PUBLICATIONS

WO 91/16598, Device for Determination of the Topography of a Surface, Date of Publication: Oct. 31, 1991.

\* cited by examiner

*Primary Examiner*—Bryan Bui
(74) *Attorney, Agent, or Firm*—Rankin, Hill, Porter & Clark LLP

(57) ABSTRACT

For indirect determination of point positions and/or of surface orientations in point positions a laser tracker (1) adapted for relative and absolute distance measurement is used. A measuring device is utilised, the device including a target point (retro-reflector 3) for the laser beam of the tracker, the target point being movable along a trajectory path (A). The position and orientation of the trajectory path (A) of the target point is precisely defined relative to a reference point (R) of the device (2) and the device (2) is positionable in the region of a point position (P) to be determined such that the position of the reference point (R) relative to the point position (P) to be determined is precisely defined. For determining the point position (P), the device (2) is positioned in the region of the point position (P) to be determined, the target point is positioned in a starting position (3.1) and is detected by the tracker (1) by direction determination and absolute distance measurement. Then the target point is moved along the trajectory path (A) being followed by the tracker (1), while direction and distance changes are recorded. In comparison with an indirect determination of a point position with the help of a known measuring tool having a plurality of stationary target points for the tracker beam, the determination by means of the target point moving along the trajectory track (A) is more simple and more accurate.

19 Claims, 3 Drawing Sheets

INDIRECT POSITION DETERMINATION WITH THE AID OF A TRACKER

BACKGROUND OF THE INVENTION

The present invention relates to geometrical measuring technology, and a device according to the present invention serves for the indirect determination of the position of points with the help of a tracker, wherein there is no need for a direct line of sight between the point position to be determined and the tracker.

A tracker includes means for generating a light beam, in particular a laser beam. With the help of a mirror, the laser beam is directed to a target point, from where it is reflected back into the tracker by a retroreflector. The tracker further includes means for automatically aligning the mirror such that the path of the reflected beam, if at all possible, is the same as the path of the emitted beam. These means allow the tracker to follow a moving target point with the mirror or with the laser beam respectively. The orientation of the mirror is recorded as a measured value representing the direction from the tracker to the target point. The tracker even further includes an interferometer for recording distance changes between the tracker and a moving target point (relative distance measurement). If so required, the tracker also comprises means for an absolute distance measurement, which means are, for example, based on the Principle of Fizeau.

Trackers are primarily used for recording the track of a moving target point or for scanning surfaces, wherein a target point is moved over the surface. However, trackers can also be used to determine the position of stationary target points, wherein these positions are defined by the (known) tracker position, by the orientation of the tracker mirror (direction of the tracker beam), and by the absolute distance between tracker and target point. For direct measurements of this kind, a direct sight connection between the target point and the tracker is needed, i.e., the tracker beam must not be interrupted between the tracker and the target point.

It would be desirable when using a tracker for determining point positions or track points to be able to do so without direct line of sight connection from the tracker to the point or track. If this were possible, the installation of a multitude of trackers or the displacement of a single tracker could be avoided in many instances.

For determining point positions using a theodolite or a digital camera (photogrammetry), tools for indirect measurement are used if there is no direct line of sight connection from the measuring instrument to the point. Such a tool comprises a reference point and at least two target points having exactly defined positions relative to each other. The tool is designed to be positioned such that the position of the reference point relative to a point position to be determined is exactly defined. For determining the position of a specific point, the tool is positioned such that the named relationship between the reference point and the specific point is established and such that between the target points of the tool and the measuring instrument there is a direct line of sight connection. Thereupon, the positions of the target points are determined and from the known positions of the target points relative to one another the position and at least partially the orientation of the tool are determined. From the calculated position and orientation of the tool, the position of the reference point—and from the known relative positions of reference point and sought point, the position of the sought point is calculated. It is also known to use such a correspondingly equipped tool for determining not only a point position but also the orientation of the surface, on which this point is located.

The relative positions of the reference point and the point to be determined are defined purely mechanically, for example with a feeler, a tip or a pin with shoulder, or else opto-mechanically, for example through a virtual point, a reticule plate or cross-hairs. The arrangement of the target points usually represents a simple geometrical shape (straight line, circle, sphere), because such a shape can be mathematically described in a very simple manner. Using the high data processing capacities available today more complicated arrangements are also applicable.

Tools for determining point positions, to which no direct line of sight connection exists, and/or for determining surface orientations are described, for example, in the publications SE-456454 or WO-91/16598.

Publication DE-4038521 also describes tools of the described type, which tools comprise two retro-reflectors positioned together with the reference point in one straight line. The distances and directions of the two retro-reflectors from the measuring instrument (tachymeter) are measured after each other. In the same publication it is suggested also to replace the two retro-reflectors by only one reflector and to displace this one reflector from a first into a second position between the two successive measurements.

The tools for the indirect determination of point positions and/or of surface orientations as described above can be used together with a tracker, for example, for determining the position of a point from which there is no direct line of sight connection to the tracker. For this purpose, the target points of the tool have to be designed as retro-reflectors. For measuring, the tracker is directed at one of the target points of the tool, the direction and the absolute distance from the tracker to the aimed at target point is determined, and this procedure is repeated for all target points of the tool. The measured directions and distances are then processed in known manner.

This procedure is possible, but rather elaborate, because the tracker has to be aimed at every single target point and this has to be done by hand unless there are special aids installed, e.g. a digital camera functionally connected with the tracker or means for enlarging the field of vision of the tracker. Furthermore, for the measurement of every target point an absolute distance measurement has to be carried out, a measurement, which due to the means as available today is substantially less accurate than the interferometric, relative distance measurement.

The elaborate procedure as described above can be avoided if the target points are arranged on the tool so close together that all of them appear in the very narrow field of view of the tracker without changing the tracker direction. This, on the other hand, restricts the accuracy considerably.

SUMMARY OF THE INVENTION

It is an object of the invention to create a device applicable for measurements using a tracker and, like the known tools mentioned above, in particular serving the determination of positions of points without a direct line of sight connection to the tracker, and/or for determining surface orientations, wherein by using the inventive device and a tracker, the disadvantages occurring when using the known tools and a tracker are avoided. The device according to the invention makes it possible to carry out indirect measurements with the help of a tracker easily and with a high accuracy, such as is customary for other tracker measurements.

It goes without saying that the device according to the invention can also be used for determining the position of points, for which, while there is a direct line of sight connection to the tracker, an indirect measurement is advantageous for other reasons. A reason of this type exists, for example, for points on a surface, on which no retro-reflector can be arranged such that its optical center is located in the point position to be determined. In such a case, the position determined by direct measurement needs to be corrected, the correction being dependent not only on the known size of the retro-reflector (distance between the point to be measured and the optical centre of the reflector), but also on the direction of this distance which may not be determined easily.

Instead of the at least two target points and their defined spatial relationship to the reference point of known tools for the indirect determination of point positions and/or surface orientations, the measuring device according to the invention only comprises one target point in the form of a retro-reflector, wherein this single target point is movable along a trajectory path, the position of the trajectory path relative to the reference point being exactly defined. For determining the position and orientation of the device, the tracker is aimed at the target point, the target point is moved along the path such that the tracker is able to follow it, and the path covered by the target point is recorded or predefined positions (e.g., starting position and end position) of the target point moving along the path are recorded. From the recorded data, the position and orientation of the device is computed in a known manner and therefrom the position of the reference point and further the sought point position and/or the surface orientation are calculated.

Using the described procedure, aiming the tracker beam at a target point and absolute distance measurement are necessary solely for the starting position of the target point. For the rest of the measuring procedure, the tracker follows the moving target point and only distance variations are measured (interferometric, relative distance measurements), which can be carried out with very high accuracy. This means that determination of the orientation of the device is based on relative distance measurements only, while determination of the position of the device is based on one absolute distance measurement. The accuracy achieved is higher than the accuracy of a method in which the tracker is to be aimed at at least two target points of a tool and the positions of the target points each have to be determined by means of an absolute distance measurement.

The absolute distance to the sole target point of the measuring device according to the invention can be determined with a quasi-absolute measurement, i.e., in that from a reference position being "visible" from the tracker and having a predefined direction and distance from the tracker, the instrument is moved into the position to be measured and is tracked by the tracker during this movement.

The trajectory path of the target point on the measuring device according to the invention advantageously has a shape, which can be mathematically described in a simple manner, for example it is a straight line or a circular arc.

In the same manner as for measuring using the at least two target points of a known tool for indirect measurement, it is necessary also for measuring with the device according to the invention, that the device is not moved during measuring. In order to reduce or the prevent forces acting on the measuring device as a result of the movement of the target point along its trajectory and such prevent movements of the device relative to the point to be measured produced by such forces, it is advantageous to install the measuring device fixedly and to install the drive for moving the target point on the device itself.

It is possible to build a control mechanism into the calculation for the determination of the position and orientation of the measuring device. If a trajectory path of the target point as recorded by the tracker does not correspond to the defined path of the target point on the measuring device to within a predefined tolerance range, then this is interpreted as a movement of the device during measurement and the measurement is rejected as unusable.

BRIEF DESCRIPTION OF THE DRAWINGS

These and further features of the invention will be apparent with reference to the following description and drawings, wherein.

DETAILED DESCRIPTION OF THE EMBODIMENTS

Figure 1:
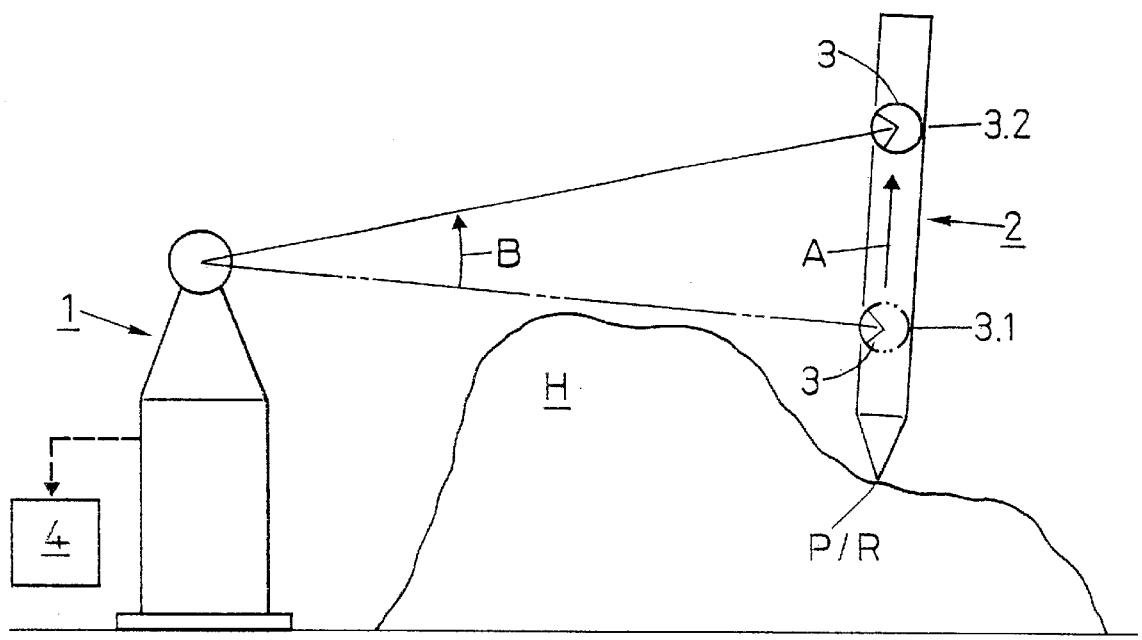
FIG. 1 shows an installation for determining a point position using the measuring device according to the invention.

FIG. 1 illustrates an installation for determining in an indirect manner the position of a point P using a tracker 1 and a measuring device 2 according to the invention. An obstruction H prevents a direct line of sight connection between the tracker 1 and the point position P to be determined. For the measuring procedure, the device 2 according to the invention is positioned such that the predefined relationship between the reference point R and the point position P to be determined is established (e.g., device tip R in the sought point P) and that a direct line of sight connection exists between the retro-reflector 3 representing the target point of the device, and the tracker 1 for the complete trajectory path (or at least for a path segment being sufficient for the measurement). The trajectory path in the depicted example is a straight-line rail, along which the retro-reflector 3 is movable from a starting position 3.1, in which the retro-reflector is illustrated with dot-dash lines, to an end position 3.2, in which the retro-reflector is depicted with an unbroken line.

For the measurement, the tracker 1 is aimed at the retro-reflector 3 in its starting position 3.1 and this starting position is determined either absolutely or relative to the tracker position. The retro-reflector 3 is then moved to the end position 3.2 (trajectory track designated with the arrow A), wherein the tracker beam follows it (arrow B) and the changes of direction and of distance are recorded. In a computer 4, in which data defining the trajectory path of the retro-reflector and its position and orientation relative to the reference point R are stored, the position and the orientation of the measuring device, the position of the reference point R and the position of the point P are calculated in an as such known manner on the basis of the measured data determined by the tracker.

Figure 2:
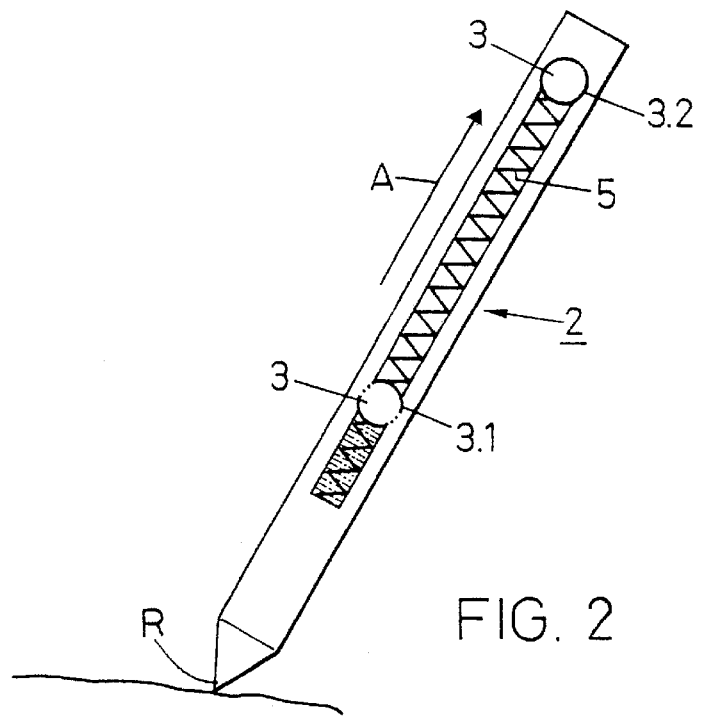
FIGS. 2 to 5 show exemplary embodiments of the measuring device in accordance with the invention.

FIG. 2 depicts in more detail as an exemplary embodiment of the inventive device, the measuring device 2 already illustrated in FIG. 1. This device is essentially rod-shaped and comprises a tip as reference point R. The target point is a retro-reflector 3 that is movable from a starting position 3.1 into an end position 3.2 along a straight-line path. The reference point is situated on the same straight line as the trajectory path of the target point (optical center of the retro-reflector 3) and has a defined distance from the starting position 3.1 or from the end position 3.2 of the target point. The system comprises a target point trajectory path and a reference point therefore represents a straight line with at least two positions at known distances from each other and can be described with the most simple mathematical model.

The drive for the movement of the retro-reflector 3 is a flat coil spring 5 actively connected with the retro-reflector 3, which spring for the starting position 3.1 is in a locked, tensioned condition. As soon as the retro-reflector 3 positioned in the starting position 3.1 has been detected by the tracker 1, the spring lock (not illustrated) is released and the retro-reflector 3 is driven to the end position 3.2 by the tension of the spring, wherein the end position 3.2 can be defined by a corresponding stop. The spring 5 has to be designed such that the speed, which the retro-reflector 3 reaches on its path from the starting position 3.1 to the end position 3.2, can be followed by the tracker. Therefore, for trackers customary today, this speed should not exceed an order of magnitude of 4 m/sec.

When using the measuring device in accordance with FIG. 1 for calculating the sought point position, use is made of the starting position 3.1 and of the orientation of the straight line, on which the trajectory path and the reference point are located (both determined by the tracker). Alternatively, use is made of the starting position 3.1 and the end position 3.2 (both determined by the tracker).

Figure 3:
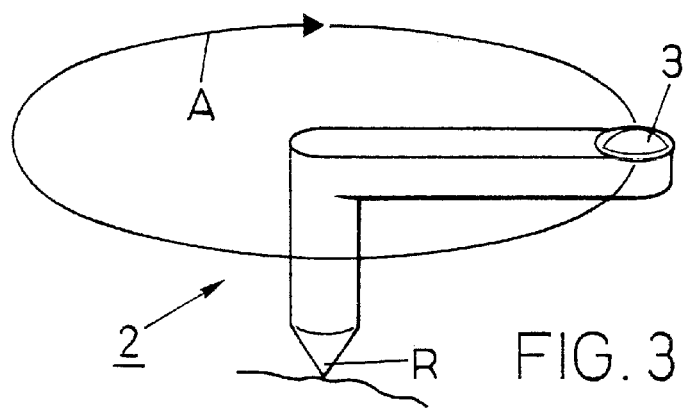

FIG. 3 schematically illustrates a further, exemplary embodiment of the measuring device 2 according to the invention. The trajectory path of the retro-reflector 3 in this case is a circular path (illustrated by arrow A), which, for example, is arranged such that it together with the reference point R forms a circular cone. The drive for the movement of the retro-reflector 3 advantageously is an electric motor arranged on the device.

Because the trajectory path of the retro-reflector 3, as shown in FIG. 3, is closed in itself and arranged symmetrically to the reference point, it is possible to record any reflector position on the trajectory path as starting position and to measure at least a part of the trajectory path for the calculation of the orientation.

Figure 4:
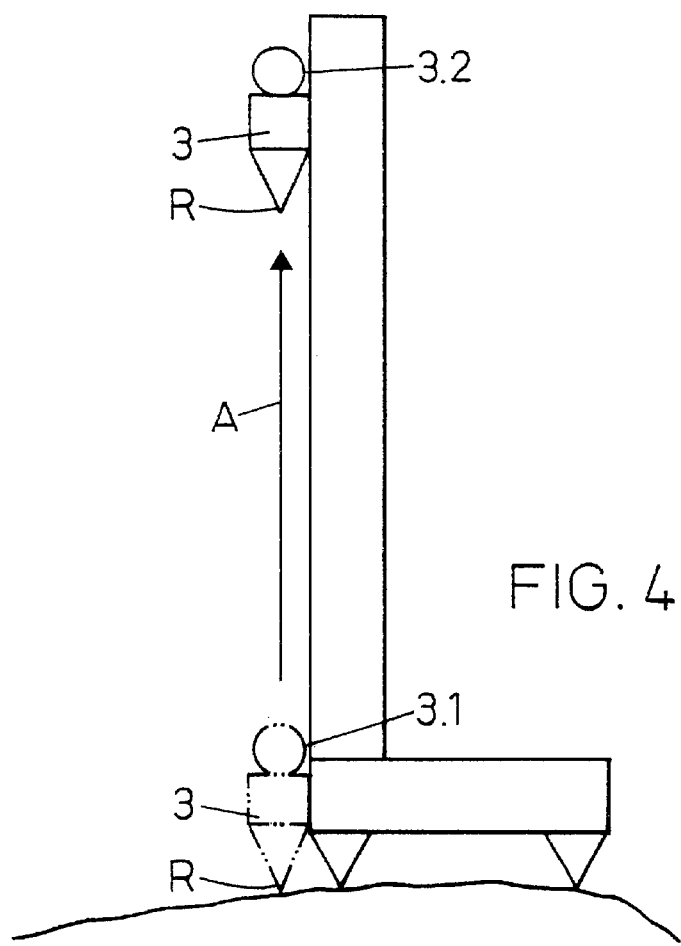

FIG. 4 depicts a further, exemplary embodiment of the device according to the invention. This device comprises a retro-reflector 3 movable along a straight-line trajectory path, and a reference point R, which is located on the same straight line. The reference point R is connected rigidly with the retro-reflector 3 and is moved together with it, wherein in the starting position 3.1 the retro-reflector establishes the predefined positional relationship of the reference point R and the point position to be determined.

The advantage of the embodiment of the device in accordance with the invention according to FIG. 4 versus the embodiment of FIG. 2 is the fact that the retro-reflector 3 is not moved relative to the reference point, in particular it is not moved towards a stop. For this reason, the distance between the optical center of the retro-reflector 3 and the reference point R, which has to be precisely known for an accurate measurement, does not change due to mechanical wear.

Figure 5:
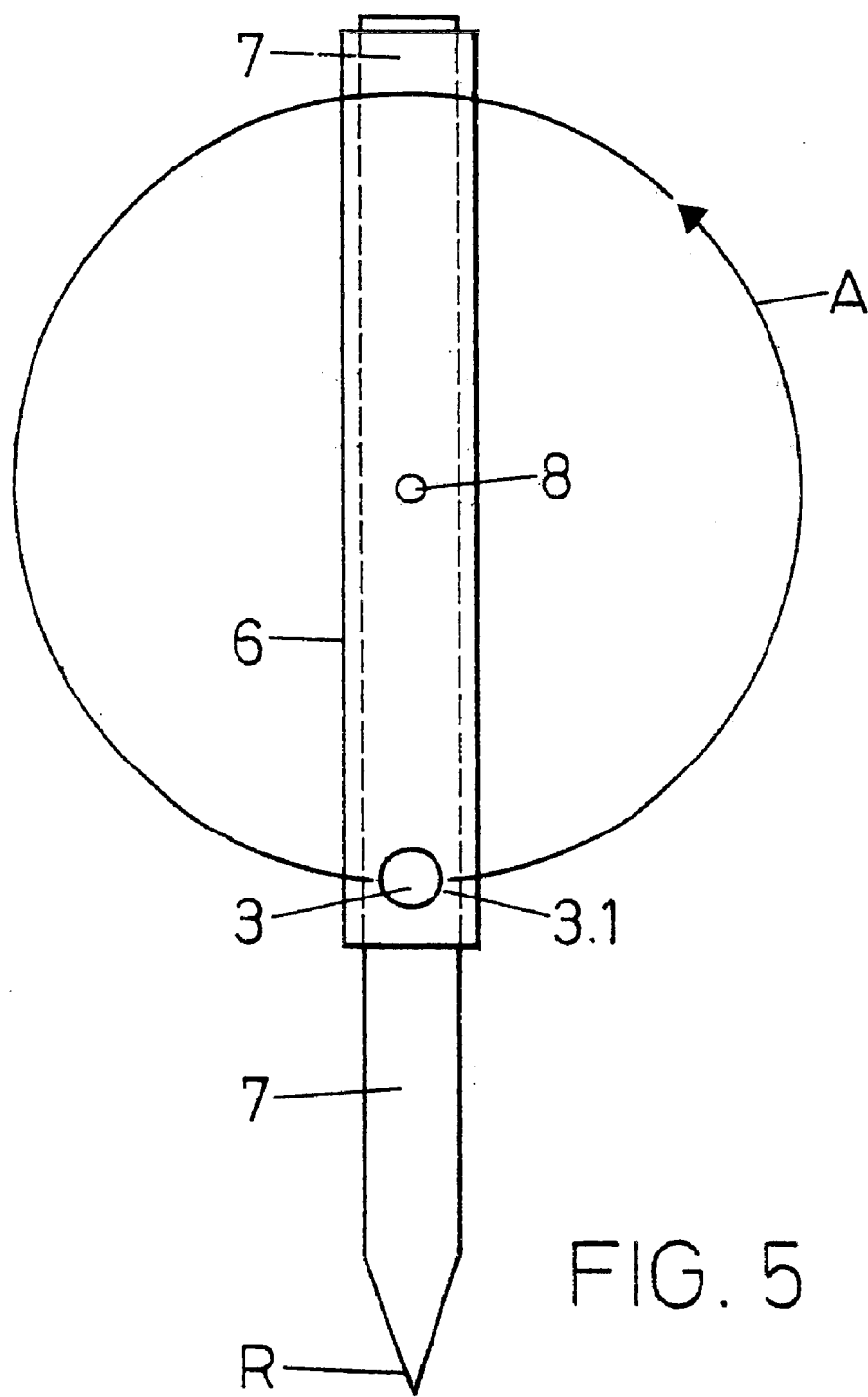

FIG. 5 schematically illustrates a further, exemplary embodiment of the device according to the invention. The device comprises a measuring ruler 7 with reference point tip R and a reflector arm 6 mounted on it and rotating around a rotation axis 8, which at its one end carries the target point (optical centre of the retro-reflector 3). When the reflector arm 6 is rotated, the retro-reflector 3 runs along a circular path (arrow A) in a plane parallel to the length of the measuring ruler. The starting position 3.1 of the retro-reflector 3, in which the retro-reflector 3, resp., the reflector arm 6 are depicted in FIG. 5, is, for example, the position in which the target point is situated on the straight line that connects the rotation axis (8) and the reference point (R) or their projections in the plane of the trajectory path respectively. This device can be described with a very simple mathematical model. Furthermore, it can be implemented with very simple means and, in case of a suitable, low-friction bearing arrangement of the reflector arm 6 on the measuring ruler 7, it can be actuated by hand without any problem.

It is not a condition, that the starting position of the target point of the device illustrated in FIG. 5 is located on a straight line with the projections of the reference point and the rotation axis. In the same manner, with a minimum additional calculation effort another starting of the target can be used.

None of FIGS. 2 to 5 show fixing means or positioning means for fixing or positioning the device in localities of points with positions to be determined, e.g. on corresponding surfaces. Suitable fixing or positioning means are known to one skilled in the art from the known tools with stationary target points and they can be arranged on the devices according to the invention in correspondence with a specific utilisation of the device. The same applies to the design of the device in the region of the reference point R.

What is claimed is:

1. A method for indirect determination of a point position (P) and/or a surface orientation in a point position with the help of a tracker (1) and with the help of a measuring device (2), the measuring device (2) comprising a retro-reflector (3) as a target point for a light beam emitted by the tracker (1) and a reference point (R), said method comprising the steps of:

positioning the measuring device (2) in a region of the point position (P) such that the reference point (R) of the measuring device (2) and the point position (P) assume predefined relative positions and such that a direct line of sight connection exists between the tracker (1) and the measuring device (2), positioning the target point of the measuring device (2) in a starting position (3.1), detecting the target point of the measuring device (2) in the starting position (3.1) with the tracker (1), determining the starting position (3.1) of the target point by determining a direction and distance between the tracker position and the target point, moving the target point away from the starting position (3.1) along a trajectory path (A) exactly defined relative to the reference point (R), following the moving target point with the light beam, recording changes in distance and direction between the tracker (1) and the moving target point, and on the basis of the determined starting position (3.1), on the basis of the trajectory path (A) of the target point tracked by the tracker (1), and on the basis of stored values concerning the trajectory path (A) and the relative arrangement of the trajectory path (A) and the reference point (R) and the relative arrangement of the reference point (R) and the point position (P), the position and the orientation of the measuring device (2), calculating the position of the reference point (R) and the point position (P) and/or the surface orientation in the point position (P).

2. The method according to claim 1, wherein changes in distance and direction between the tracker (1) and the target point are registered when the target point has arrived in an end position (3.2) on the trajectory path.

3. The method according to claim 1, wherein the changes in distance and direction between the tracker (1) and the target point are registered during movement of the target point along the trajectory path (A).

4. The method according to claim 1, wherein, relative to the reference point, the exactly defined trajectory path (A) is a straight line.

5. The method according to claim 1, wherein, relative to the reference point (R), the exactly defined trajectory path (A) is closed in itself.

6. The method according to claim 5, wherein, relative to the reference point (R), the exactly defined trajectory path (A) has a circular shape.

7. The method according to claim 6, wherein the circular trajectory path (A) is arranged symmetrically to the reference point and wherein the target point is moved from a freely selected starting position along at least a part of the circular trajectory path (A).

8. A system for indirect determination of a point position (P) and/or a surface orientation in a point position, the system comprising:

tracker (1) operable to emit a light beam, a measuring device (2) comprising a retro-reflector (3) as a target point for the light beam emitted by the tracker (1) and a reference point (R), wherein the measuring device (2) is positionable in a region of the point position (P) such that the reference point (R) of the measuring device (2) and the point position (P) assume predefined relative positions and such that a direct line of sight connection exists between the tracker (1) and the measuring device (2), wherein the target point of the measuring device (2) is movable along a trajectory path (A) exactly defined relative to the reference point (R) and wherein the tracker (1) is operable to track the moving target point and a computer adapted to calculate the position and orientation of the measuring device (2), the position of the reference point (R) and at least one of the point position (P) and the surface orientation in the point position (P) on the basis of a starting position (3.1) of the target point on the trajectory path (A) as determined by the tracker, on the basis of the movement of the target point along the trajectory path as tracked by the tracker (1) and on the basis of stored values concerning the trajectory path (A) and the relative arrangement of the trajectory path (A) and the reference point (R) and the relative arrangement of the reference point (R) and the point position (P).

9. The system according to claim 8, wherein, relative to the reference point (R), the exactly defined trajectory path (A) is a straight line.

10. The system according to claim 9, wherein the reference point (R) is rigidly connected with the retro-reflector (3).

11. The system according to claim 8, wherein, relative to the reference point (R), the exactly defined trajectory path (A) is closed in itself.

12. The system according to claim 11, wherein, relative to the reference point (R), the exactly defined trajectory path (A) has a circular shape.

13. The system according to claim 12, wherein the measuring device (2) comprises a measuring ruler (7), at an end of which the reference point (R) is located, and a reflector arm (6) arranged on the measuring ruler (7) for rotation parallel to a length of the measuring ruler in a bearing, and wherein the reflector arm (6) is lockable in one rotation position.

14. The system according to claim 13, wherein the lockable rotation position of the reflector arm (6) is such that, in this position, the retro-reflector (3) and the projections of the axis of rotation (8) of the reflector arm (6) and the reference point (R) on the plane of the circular path of the target point are on a straight line.

15. The system according to claim 12, wherein the circular trajectory path (A) is arranged symmetrically to the reference point and wherein the retro-reflector (3) is moved from a freely selected starting position along at least a part of the circular trajectory path (A).

16. The system according to claim 8, wherein the measuring device (2) comprises a drive for moving the retro-reflector (3) along the trajectory path (A).

17. The system according to claim 16, wherein the drive is a spring (5) with a locking device or a motor.

18. The system according to claim 8, wherein the relationship between the point position (P) to be determined and the reference point (R) is a mechanical one or a mechanical-optical one.

19. The system according to claim 18, wherein the reference point (R) is located on a tip of the device (2), said tip being positionable in the point position (P) to be determined.

* * * * *

UNITED STATES PATENT AND TRADEMARK OFFICE
CERTIFICATE OF CORRECTION

PATENT NO. : 6,675,122 B1
DATED : January 6, 2004
INVENTOR(S) : Markendorf et al.

It is certified that error appears in the above-identified patent and that said Letters Patent is hereby corrected as shown below:

Column 7,
Line 26, before "tracker" insert -- a --.

Signed and Sealed this

Sixteenth Day of March, 2004

JON W. DUDAS
*Acting Director of the United States Patent and Trademark Office*